(12) United States Patent
Kim et al.

(10) Patent No.: US 10,237,499 B2
(45) Date of Patent: Mar. 19, 2019

(54) APPARATUS AND METHOD FOR PROCESSING AN IMAGE IN DEVICE

(71) Applicant: Samsung Electronics Co., Ltd., Suwon-si, Gyeonggi-do (KR)

(72) Inventors: Moonsoo Kim, Seoul (KR); Hongsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/404,831

(22) Filed: Jan. 12, 2017

(65) Prior Publication Data

US 2017/0126989 A1 May 4, 2017

Related U.S. Application Data

(63) Continuation of application No. 14/174,234, filed on Feb. 6, 2014, now Pat. No. 9,565,333.

(30) Foreign Application Priority Data

Feb. 26, 2013 (KR) ........................ 10-2013-0020599

(51) Int. Cl.
| | |
|---|---|
| *H04N 1/21* | (2006.01) |
| *H04N 5/232* | (2006.01) |
| *H04N 5/225* | (2006.01) |
| *H04N 5/272* | (2006.01) |
| *G06K 9/00* | (2006.01) |

(52) U.S. Cl.
CPC ........... *H04N 5/272* (2013.01); *H04N 1/2133* (2013.01); *H04N 5/2258* (2013.01); *H04N 5/23216* (2013.01); *H04N 5/23219* (2013.01); *H04N 5/23245* (2013.01); *H04N 5/23293* (2013.01)

(58) Field of Classification Search
CPC ............. H04N 1/2133; H04N 5/23216; H04N 5/23245; H04N 5/23219; H04N 5/23293; H04N 5/272; H94N 5/2258; G06K 9/00221
USPC ............ 348/333.01, 333.02, 333.05, 333.06, 348/218.1, 239, 231.99, 333.11, 333.12, 348/218.9
See application file for complete search history.

(56) References Cited

U.S. PATENT DOCUMENTS

| | | | |
|---|---|---|---|
| 5,837,899 A | 11/1998 | Dickerman et al. | |
| 7,440,013 B2 * | 10/2008 | Funakura | ............... H04N 5/232 348/239 |

(Continued)

FOREIGN PATENT DOCUMENTS

| | | |
|---|---|---|
| CN | 1201525 A | 12/1998 |
| CN | 102215217 A | 10/2011 |

(Continued)

*Primary Examiner* — Marly S Camargo
(74) *Attorney, Agent, or Firm* — Jefferson IP Law, LLP

(57) ABSTRACT

A method of processing an image using an electronic device is provided. The method includes displaying at least part of a first image which is obtained through a first image sensor and at least part of a second image which is obtained through a second image sensor through a display unit which is functionally connected to the electronic device, storing the at least part of the first image, storing the at least part of the second image in response to a detecting of a signal, and storing the at least part of the first image and the at least part of the second image to be simultaneously replayed as at least one image.

20 Claims, 10 Drawing Sheets

(56) References Cited

U.S. PATENT DOCUMENTS

| | | |
|---|---|---|
| 7,583,316 B2 | 9/2009 | Miyashita et al. |
| 9,350,924 B2* | 5/2016 | Posa .................... H04N 5/272 |
| 2003/0117501 A1 | 6/2003 | Shirakawa |
| 2005/0036044 A1 | 2/2005 | Funakura |
| 2006/0044396 A1 | 3/2006 | Miyashita et al. |
| 2006/0176364 A1 | 8/2006 | Lai et al. |
| 2007/0057866 A1 | 3/2007 | Lee et al. |
| 2008/0062291 A1 | 3/2008 | Sako et al. |
| 2010/0079613 A1 | 4/2010 | Karimoto et al. |
| 2010/0302409 A1* | 12/2010 | Matas .................... H04N 5/772 |
| | | 348/231.99 |
| 2011/0205383 A1 | 8/2011 | Shah |
| 2011/0249073 A1 | 10/2011 | Cranfill et al. |
| 2011/0252373 A1 | 10/2011 | Chaudhri |
| 2012/0008011 A1 | 1/2012 | Garcia Manchado |
| 2012/0120186 A1 | 5/2012 | Diaz et al. |
| 2012/0182435 A1 | 7/2012 | Silberstein |
| 2012/0274808 A1 | 11/2012 | Chong et al. |
| 2013/0235224 A1* | 9/2013 | Park .................... H04N 5/225 |
| | | 348/218.1 |
| 2014/0225980 A1 | 8/2014 | Patel |
| 2015/0009349 A1* | 1/2015 | Kim .................... H04N 5/232 |
| | | 348/218.1 |

FOREIGN PATENT DOCUMENTS

| | | |
|---|---|---|
| CN | 102624969 A | 8/2012 |
| CN | 102761702 A | 10/2012 |
| KR | 10-2006-0068146 A | 6/2006 |
| KR | 10-2008-0063996 A | 7/2008 |

* cited by examiner

APPARATUS AND METHOD FOR PROCESSING AN IMAGE IN DEVICE

CROSS-REFERENCE TO RELATED APPLICATION(S)

This application is a continuation application of prior application Ser. No. 14/174,234, filed on Feb. 6, 2014, which claimed the benefit under 35 U.S.C § 119(a) of a Korean patent application filed on Feb. 26, 2013 in the Korean Intellectual Property Office and assigned Ser. No. 10-2013-0020599, the entire disclosure of each of which is hereby incorporated by reference.

TECHNICAL FIELD

The present disclosure relates to a method and apparatus for photographing an image. More particularly, the present disclosure relates to an apparatus and method for photographing a plurality of images, which are detected by at least one image sensor, by using an electronic device such as a smartphone.

BACKGROUND

Generally, a method of photographing an image in a camera device displays image data, which is obtained from the image sensor of each camera, on a display unit, and compresses and encodes obtained image data and stores the image data in a memory if a user gives a command to take a photograph.

An existing camera device or a portable terminal equipped with a camera may include a plurality of cameras, including high pixel cameras or low pixel cameras. The plurality of cameras are mounted on a front side and a rear side of the camera device or the portable terminal. Further, the camera device or the portable terminal including the plurality of cameras, that is, dual cameras, may photograph a front side subject or a rear side subject by independently selecting the front camera and the rear camera. That is, the camera device or the portable terminal including a plurality of cameras may respectively photograph different images, and separately store and manage photographed images.

Further, the camera device or the portable terminal including a plurality of cameras may obtain a plurality of images by operating a plurality of cameras, and compose and store the obtained images by Picture In Picture (PIP) type. Currently, when a plurality of cameras are simultaneously driven, it is difficult to obtain a plurality of natural images. That is, in the photographic mode, the user performs a photographic operation by checking images outputted from the front side or rear side camera, and thus it is difficult to simultaneously check and photograph images which are outputted from a plurality of cameras. Hence, images, which are photographed from respective image sensors, may be photographed in a desired form by controlling respective images sensors in a device including a plurality of image sensors.

Accordingly there is a need for an apparatus and method capable of capturing images while consecutively controlling image sensors by using a timer when a photographic operation is requested in an electronic device equipped with a plurality of image sensors.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for enhancing user convenience when photographing a plurality of images by using at least one image sensor.

Another aspect of the present disclosure is to provide an apparatus and method capable of photographing a plurality of images while controlling a plurality of image sensors.

Another aspect of the present disclosure is to provide an apparatus and method capable of capturing images while consecutively controlling image sensors by using a timer when a photographic operation is requested in an electronic device equipped with a plurality of image sensors.

Another aspect of the present disclosure is to provide an apparatus and method capable of capturing images while controlling image sensors by performing a first photographic operation when a photographic operation is requested in an electronic device equipped with a plurality of image sensors and performing the photographic operation by operating a timer when a certain action is sensed.

In accordance with an aspect of the present disclosure, a method of processing an image using an electronic device is provided. The method includes displaying at least part of a first image which is obtained through a first image sensor and at least part of a second image which is obtained through a second image sensor through a display unit which is functionally connected to the electronic device, storing the at least part of the first image, storing the at least part of the second image in response to a detecting of a signal, and storing the at least part of the first image and the at least part of the second image to be simultaneously replayed as at least one image.

In accordance with another aspect of the present disclosure, a method of processing an image using an electronic apparatus is provided. The method includes displaying at least part of a first image which is obtained through a first image sensor and at least part of a second image which is obtained through a second image sensor through a display unit which is functionally connected to the electronic device, storing the at least part of the first image, storing the at least part of the second image after a second time period elapses if a signal is sensed, storing the at least part of the second image if the signal is not sensed within a first time period from the storing of the at least part of the first image, and simultaneously replaying the at least part of the first image and the at least part of the second image as at least one image.

In accordance with another aspect of the present disclosure, an electronic device is provided. The electronic device includes a storage unit configured to store image information, and a controller configured to process the image information, wherein the controller is configured to display at least part of a first image, which is obtained through a first image sensor, and a part of a second image, which is obtained through a second image sensor, through a display unit which is functionally connected to the electronic device, to store the at least part of the first image, to store the at least part of the second image in response of a detecting of a signal, and to simultaneously replay the at least part of the first image and the at least part of the second image as one image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
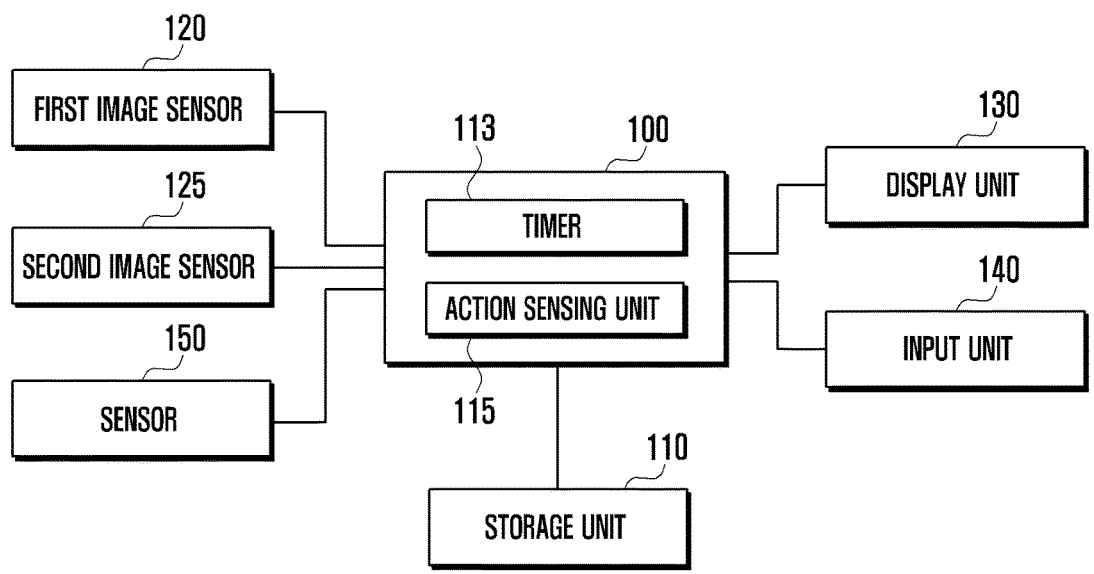
FIG. 1 illustrates a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A camera device or a portable terminal equipped with a camera may include a plurality of cameras, display images obtained from a plurality of cameras in a preview mode on one screen in the form of a main screen and a sub-screen, or display the main screen and the sub-screen on the display unit in a parallel form. Likewise, if a photographic operation is requested in a state in which a preview image is displayed as described above, a device equipped with a camera according to an embodiment of the present disclosure may first capture the main screen image and the sub-screen image, compose the captured main-screen and sub-screen images, and store the composed images. In the description below, a camera device or a device equipped with a camera will be described as an electronic device, and the electronic device may include a smart phone, a tablet computer, and a device including a camera device, etc. Further, the electronic device may be a device including two or more image sensors.

In a method of photographing the main screen image and the sub-screen image according to one embodiment of the present disclosure, the electronic device may capture the main screen image which is outputted from the image sensor which generates the main screen image when a photographic operation is requested, and display the sub-screen image, which is outputted from the image sensor which generates the sub-screen image, as a preview image. If an action is sensed, the electronic device may operate a timer and capture a sub-screen image which is outputted from an image sensor which generates the sub-screen image when the timer expires. The electronic device may compose the captured main screen image and sub-screen image, and process the composed image and store the processed image. The main screen may be a first screen, and the second screen may be a sub-screen.

In a method of photographing the main screen image and the sub-screen image according to another embodiment of the present disclosure, first, an electronic device may capture the main-screen image which is outputted from the image sensor which generates the main screen image, and may preview-display an image which is outputted from the image sensor which generates the sub-screen image and operate a timer. Further, when the timer expires, the electronic device may capture a sub-screen image which is outputted from a second image sensor which generates the sub-screen image. The electronic device may compose the main screen image and the sub-screen image which are captured by the timer, process the composed image, and store the processed imaged.

In the description below, it is assumed that the electronic device includes a dual image sensor. Further, it is assumed that the dual image sensor of the electronic device is mounted respectively on the rear side of the electronic device and the front side where the display unit is mounted, and the front image sensor is positioned at the bezel area of the display unit. The image sensor, which is mounted on the rear side of the electronic device, may be a first camera which is mounted on the first side of the electronic device, and the front camera, which is mounted on the front side of the electronic device, may be a second camera which is mounted on the second side.

Further, the image sensor may include image sensors which are functionally connected by using a wireless connection such as a Near Field Communication (NFC) and Wireless FIdelity (WIFI) as well as an image sensor which is connected to the terminal.

It is assumed that the electronic device according to an embodiment of the present disclosure includes a first image sensor, which is mounted on the rear side of the electronic device, and a second image sensor, which is mounted on the front side of the electronic device including a display unit. Further, in the preview mode of the dual photographic mode, the electronic device may display the image obtained from the first image sensor as the main screen, and display images obtained from the second image sensor as the sub-screen of the main screen. The electronic device may display the main screen image obtained from the first image sensor on the whole screen of the display unit, or partly display the main screen image on the display unit. Further, in the electronic device, the sub-screen image obtained from the second image sensor may be displayed in the form of PIP of the main screen, or in parallel.

Further, when a photographic operation is requested in the preview mode, the electronic device may capture a first image of the main screen which is obtained from the first image sensor, capture a second image of the sub-screen which is obtained from the second image sensor after a time period elapses, and compose and store the first and second images. The sequential photographic method may be set by the timer, or, if an action is sensed after the main screen image is captured, the timer may be operated, and when the timer expires, the sub-screen may be automatically captured in the sequential photographic method.

FIG. 1 illustrates a configuration of an electronic device according to an embodiment of the present disclosure.

Referring to FIG. 1, a first image sensor 120 (rear image sensor) may be mounted on the rear side of the electronic device, and a second image sensor 125 (front image sensor) may be mounted on a front side bezel area of the electronic device. The first image sensor 120 may be an image sensor of higher pixel density than the pixel density of a second image sensor 125. The first image sensor 120 and the second image sensor 125 may be independently operated under control of the controller 100, or may be simultaneously operated. Further, the first image sensor 120 and the second image sensor 125 may photograph a still image or moving image under control of the controller 100.

The controller 100 controls overall operation of the electronic device. Further, the controller 100 may operate, respectively or simultaneously, the first image sensor 120 and/or the second image sensor 125, display the images, which are photographed when simultaneously operated, as the dual screen of the main screen and the sub-screen, and photographing and editing of the dual screen.

The sub-screen may be a Picture In Picture (PIP) type. Further, the controller 100 may include a timer 113 and an action sensing unit 115, and when a photographic operation is requested in the preview mode, the controller 100 may photograph the main screen and the sub-screen images while controlling the first image sensor 120 and the second image sensor 125 by using the timer 113 and/or the action sensing unit 115, and compose and store the photographed images.

The storage unit 110 may include a program memory which stores an operating program of the electronic device and a program according to an embodiment of the present disclosure, and a data memory which stores photographed images.

The display unit 130 may be mounted on the front side of the electronic device as in the second image sensor 125, and display the images which are obtained from the first image sensor 120 and/or the second image sensor 125 under control of the controller 100. The display unit 130 may be configured with an LCD or an OLED. The input unit 140 may generate inputs for controlling a photographic mode of the electronic device. The display unit 130 and the input unit 140 may be formed as an integrated touch screen.

The sensor 150 may include at least one sensor for sensing the state of the electronic device. The sensor may be a geomagnetic sensor, an acceleration sensor and/or a gyro sensor, and may generate a signal for sensing the change according to the rotation and/or the disposed state of the electronic device and output the signal to the controller 100.

The controller 100 of the electronic device having the above configuration may obtain a plurality of images by simultaneously operating (dual mode) the first image sensor 120 and the second image sensor 125, and display the obtained image on the display unit 130 as the main screen and the sub-screen. The controller 100 may change the main screen and the sub-screen according to the user's selection. Further, when a photographic operation is requested at the dual mode (dual shot), the electronic device may photograph by operating the first image sensor 120 and the second image sensor 125 according to an order, and compose the photographed main screen and sub-screen images to generate one still image.

A dual image may be photographed by using the timer 113 and the action sensing unit 115. If the user requests a photographic operation in the preview mode, the controller 100 may capture the main screen image which is outputted from the image sensor which generates the main screen image, and preview-display the sub-screen image which is outputted from the image sensor which generates the sub-screen image. If the action sensing unit 115 senses an action, the controller 100 operates the timer 113, and, when the timer 113 expires, may capture the sub-screen image which is outputted from the image sensor which generates the sub-screen image. The electronic device may compose the captured main screen image and sub-screen image, and process and store the composed image.

The main screen and sub-screen image may be photographed by using the timer. In such a case, the controller 100 may capture the main-screen image, which is outputted from the image sensor which generates the main screen image when a photographic operation is requested, preview-display the image, which is outputted from the image sensor which generates the sub-screen image, and operate the timer 113. Further, if the timer 113 expires, the controller 100 may capture the sub-screen image which is outputted from the second image sensor which generates the sub-screen image. The controller 100 may compose the captured main screen image and sub-screen image, process and store the composed images.

Figure 2A:
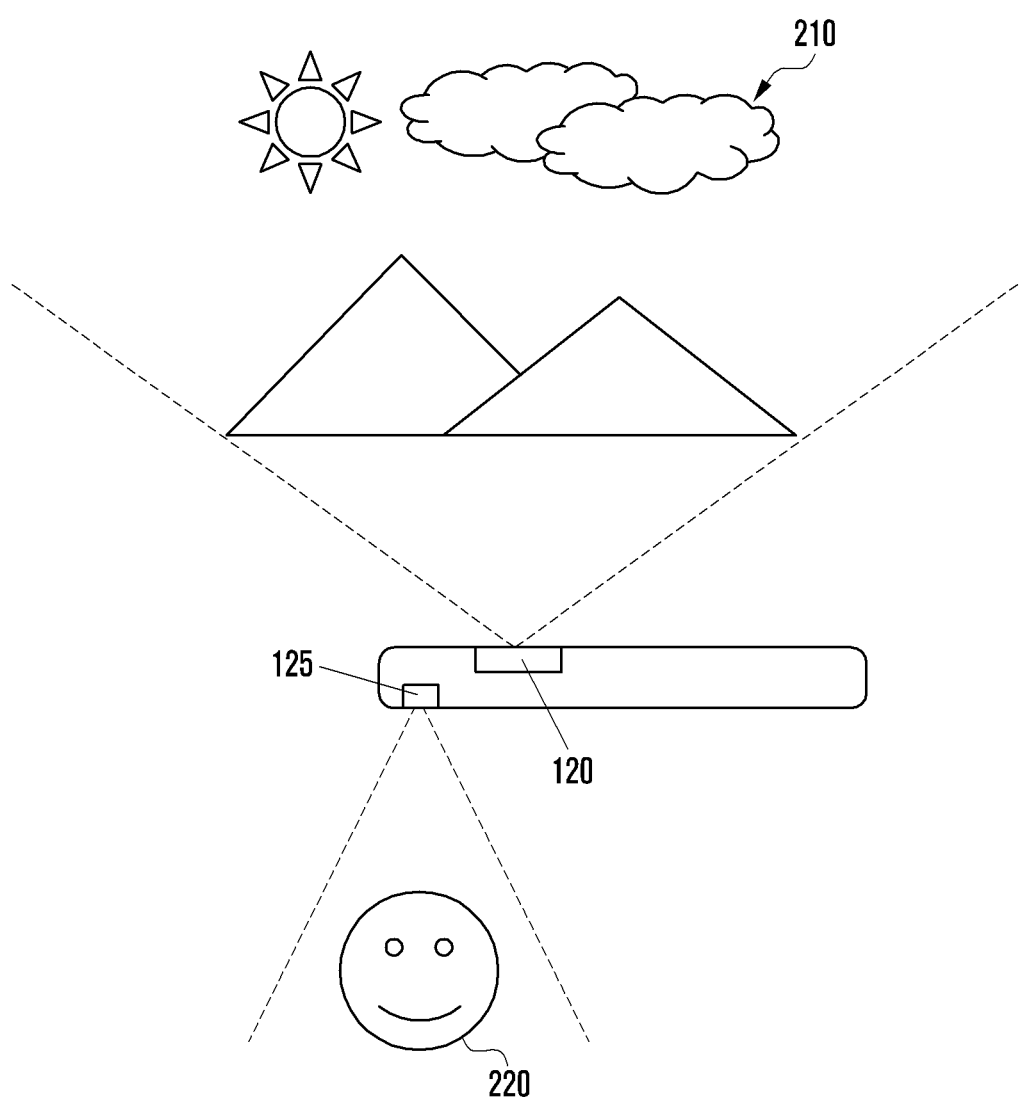
FIGS. 2A, 2B, and 2C illustrate a procedure of displaying and photographing a dual image in an electronic device equipped with a dual image sensor according to an embodiment of the present disclosure.
Figure 2B:
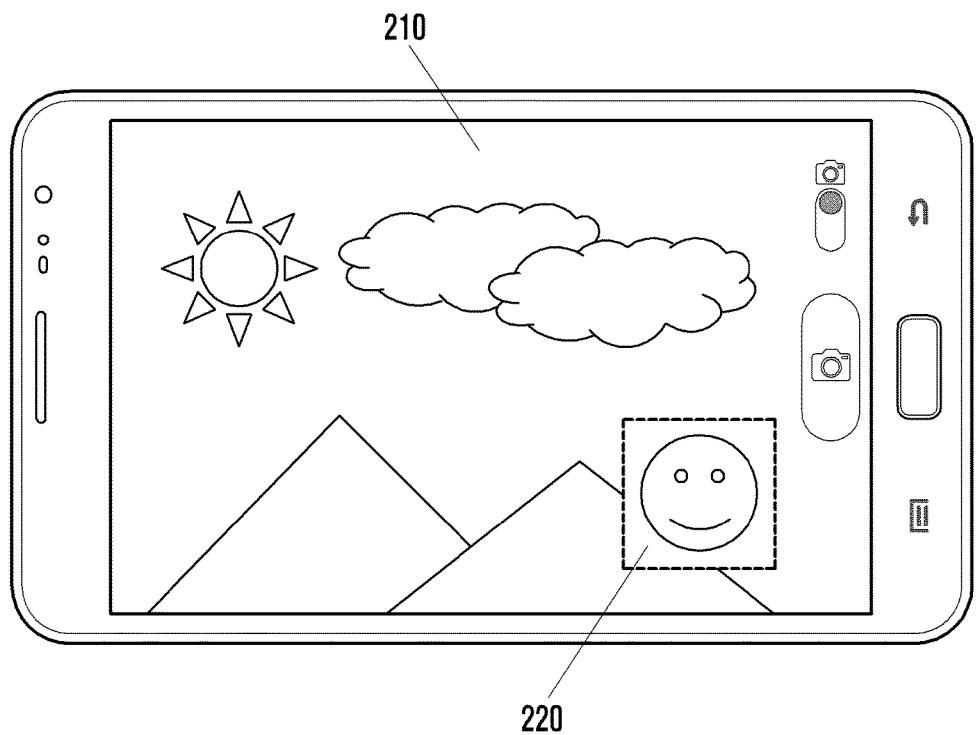
Figure 2C:
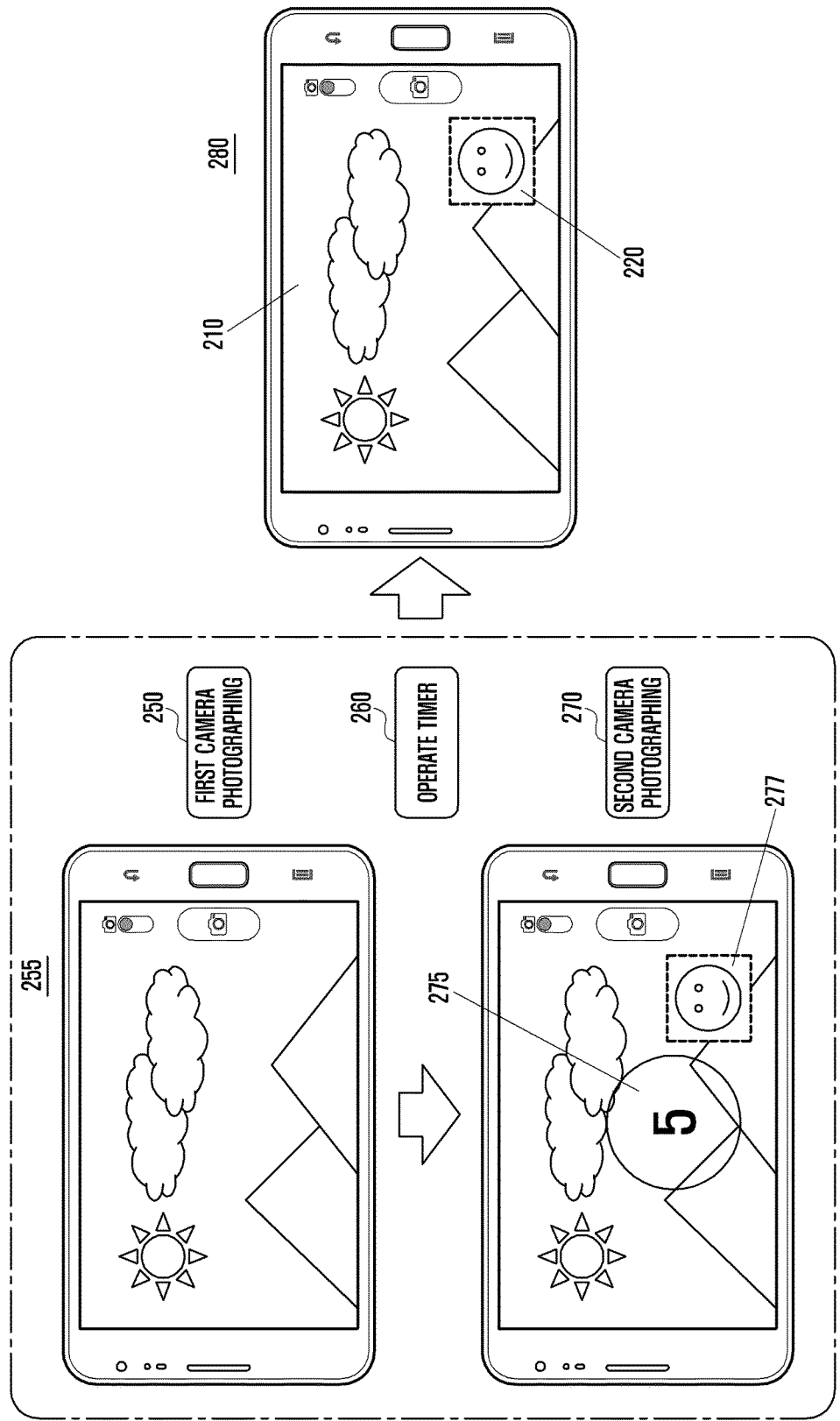

FIGS. 2A to 2C illustrate a procedure of displaying and photographing a dual image in an electronic device equipped with a dual image sensor according to an embodiment of the present disclosure. FIGS. 2A to 2C show an example of generating the main screen image in the first image sensor 120 and generating the sub-screen image in the second image sensor 125. However, the main screen image may be generated in the second image sensor 125 and the sub-screen image may be generated in the first image sensor 120 according to the user's selection.

Referring to FIGS. 2A to 2C, in the preview mode where the first image sensor 120 and the second image sensor 125 are operated, the first image sensor 120 photographs the first image (i.e., a scenery image) as in reference numeral 210, and the second image sensor 125 photographs the second image (i.e., an image of a photographer) as in reference numeral 220. The controller 100 may display the first image 210, which is obtained from the first image sensor 120, as the main screen as in FIG. 2B, and may display the second image 220, which is obtained from the second image sensor 125, as the sub-screen.

If a photographic operation is requested in the preview mode, the electronic device according to an embodiment of the present disclosure may photograph the main screen image and the sub-screen image as in FIG. 2C.

Referring to FIG. 2C, if a photographic operation is requested in the preview mode, as the operation in reference numeral 250, the controller 100 may capture the main screen image, as in reference numeral 255, which is generated in the first image sensor 120 and operate the timer as in reference numeral 260. The controller 100 may display the captured main screen image on the display unit 130, display the preview image of the sub-screen as in reference numeral 277, and display operation of the timer as in reference numeral 275. If the timer expires, the controller 100 may capture the sub-screen image 277. In this case, the captured image may be an image as shown in reference numeral 280.

Here, FIGS. 2B and 2C illustrate an example where the second image 220, which is obtained from the second image sensor 125, is fixed on the lower left area of the display unit 130. However, if necessary, the display area of the image, which is displayed as the sub-screen, may be variably set. For example, the sub-screen display area may be displayed on the area adjacent to the image sensor (e.g., the second image sensor 125). In the dual mode, the second image sensor 125 photographs the user's image, and, in such a case, if the sub-screen display area is set at a position adjacent to the second image sensor 125, a natural sub-screen image may be obtained.

That is, if the sub-screen display area is set at a position adjacent to the second image sensor 125, the direction of photography (view angle) of the second image sensor 125 may be set to coincide with the user's eyes as much as possible, and thus a natural user's image may be obtained. Likewise, if the sub-screen image is displayed as described above, the controller 100 may capture the sub-screen image which is displayed in the preview mode when a photographic operation is requested, and may move the captured sub-screen image to the sub-screen area, which is the original sub-screen area when composing images, to compose the image with the main screen image.

Alternatively, if a photographic operation is requested in the preview mode, as the operation in reference numeral 270, the controller 100 may capture the main screen image from the second image sensor 125 and may capture the sub-screen from the first image sensor 120.

Figure 3:
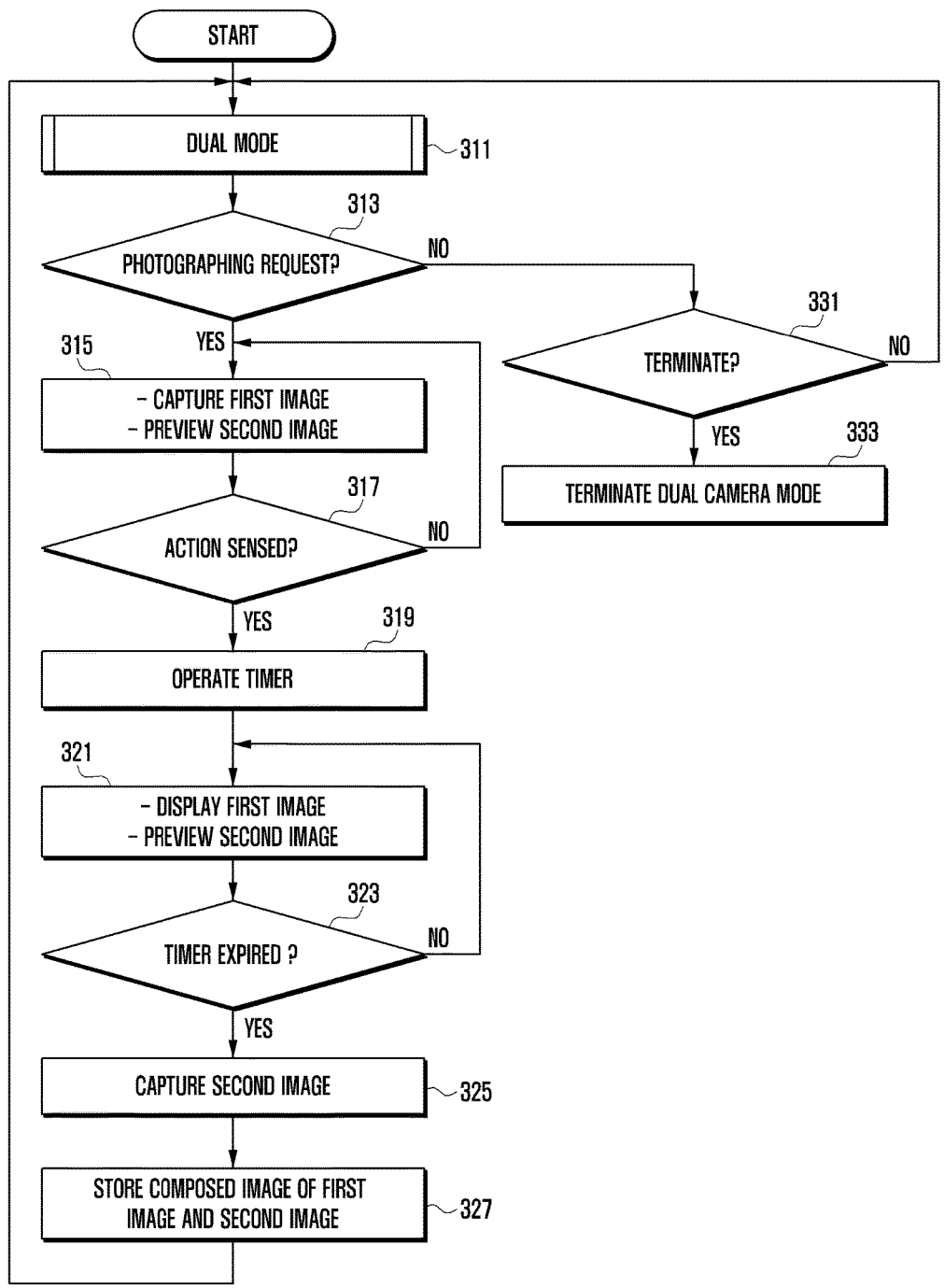
FIG. 3 is a flowchart illustrating a procedure of photographing images in an electronic device equipped with a dual image sensor according to an embodiment of the present disclosure.

FIG. 3 is a flowchart illustrating a procedure of photographing images in an electronic device equipped with a dual image sensor according to one embodiment of the present disclosure.

Referring to FIG. 3, if the operation of dual image sensor is requested through the input unit 140, the controller 100 may perform the dual image sensor mode at operation 311.

Figure 4:
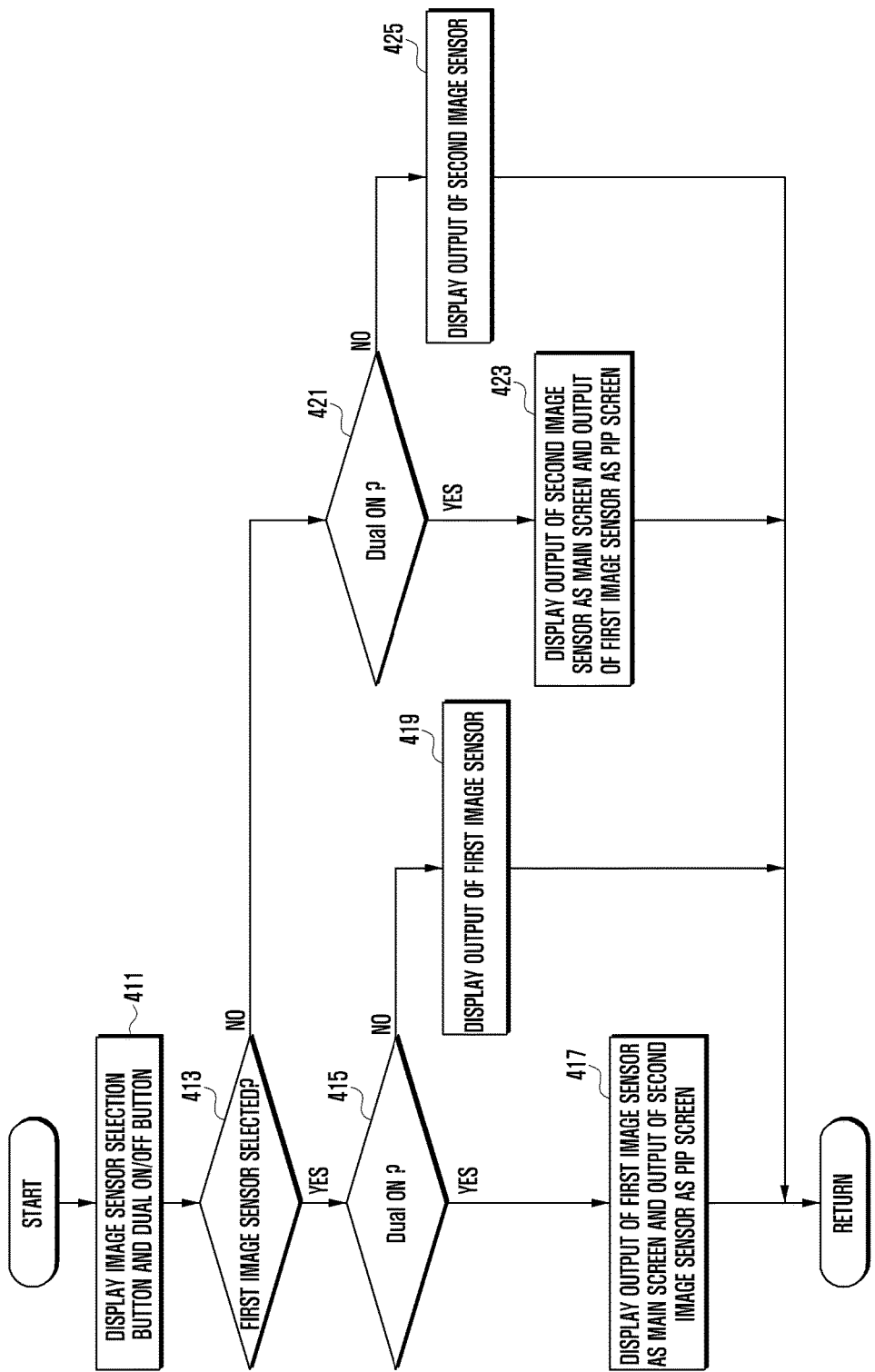
FIG. 4 is a flowchart illustrating a procedure of performing a preview mode in a dual mode according to an embodiment of the present disclosure.

FIG. 4 is a flowchart illustrating a procedure of performing a preview mode in a dual mode according to an embodiment of the present disclosure.

Referring to FIG. 4, in the electronic device which operates the first image sensor 120 and the second image sensor 125, the controller 100 may display an image sensor selection button and a dual button on the preview screen at operation 411. The image sensor selection button is a button for selecting an image sensor which photographs an image which is displayed as the main screen, and the dual button is a button for selecting a dual-on mode and a dual-off mode. The image sensor selection button and the dual button may be a button which is operated in a toggle type.

If the first image sensor 120 is selected by the camera button, the controller 100 senses the selection of the first image sensor, and may select the first image sensor 120 as an image sensor for generating the main screen image at operation 413. Further, if the user touches the dual button in a state in which the first image sensor 120 is selected, the controller 100 senses the dual-on mode at operation 415, and operates the second image sensor 125 at operation 417. The controller 100 may process an image obtained from the first image sensor 120 and display the processed image on the display unit 130 as the main screen, and process and resize the image obtained from the second image sensor 125, and display the processed and resized image as the sub-screen on a position of the display unit 130 at operation 417.

The controller 100 may already recognize the size and the displayed position of the image which is displayed as the sub-screen, and the sub-screen may be displayed as overlay with a size at a position of the main screen. The display position and size of the sub-screen is previously set with a default display position and size, and the display position and/or display size may be changed according to user's selection. However, if the dual mode is turned off (dual off) through a dual button in a state in which the first image sensor 120 is selected, the controller 100 may sense the dual off at operation 415, and process an image obtained from the first image sensor 120 and display the processed image on the display unit 130 at operation 419. The operation of the second image sensor 125 may be a turned-off state.

Further, if the user selects the second image sensor 125 by using a camera button, the controller 100 may sense the selection of the second image sensor at operation 413, and may analyze the state of the dual button at operation 421. If the state is in a dual off state, the controller 100 may sense the dual off state at operation 421, and operate the second image sensor 125 and turn off operation of the first image sensor 120 at operation 425. Further, the controller 100 may process the image obtained from the second image sensor 125 and output to the display unit 130. The operation of the first image sensor 120 may be in an off state.

However, if the user touches the dual button in a state in which the second image sensor 125 has been selected as an image sensor which generates the main screen image, the controller 100 senses the touch at operation 421 and performs the dual mode by operating the first image sensor 120 at operation 423. In this case, the controller 100 may process an image obtained from the second image sensor 125 to display the processed image as the main screen on the display unit 130, and process and resize the image obtained from the first image sensor 120 to display as the sub-screen at a position of the display unit 130.

In the description below, it is assumed that the first image, which is generated in the first image sensor 120, is selected as the main screen image, and the dual mode is in a turned-on state. Further, it is assumed that, in the photographic mode, first, the first image, which is the main screen image, is captured, and the second image, which is the sub-screen image, is captured. However, when a photographic operation is requested, first, the electronic device may capture the sub-screen image, and may capture the main screen image.

Referring to FIG. 3 again, in the preview mode of the dual image sensor, the controller 100 may process the first image outputted from the first image sensor 120 to display the processed image as the main screen on the display unit 130, and process the second image photographed in the second image sensor 125 to display the processed image on the display area of the sub-screen. The controller 100 may include an image signal processor, and the image signal processor may include an image pre-processing unit, an image post-processing unit, an image scaler, a Codec, and the like. In such a case, the first image outputted from the first image sensor 120 may be pre-processed and post-processed in the image signal processor, and may be scaled with the main screen size of the display unit 130 by the image scaler and outputted. Further, the second image, which is outputted from the second image sensor 125, may be pre-processed and post-processed in the image signal processor, and may be scaled with the sub-screen size by the image scaler and outputted.

If a photography request occurs in the preview mode, the controller 100 may capture the first image outputted from the first image sensor 120 and the second image which is photographed in the second image sensor 125, and compose the captured images and store the composed images in the storage unit 110. Generally, when a dual shot is photographed by using a dual image sensor, the user sets the main screen image suitable to the photographic frame, and in such a case, the photographic frame of the sub-screen image may not be desirable. In such a case, the sequential photographic method may be used. According to the sequential photographic method, the main screen image may be first set with a desired photographic frame to photograph, and the sub-screen image may be set with a desired photographic frame to photograph. Further, in the sequential photographic mode, the controller 100 may display on the display unit 130 that the currently displayed main screen and sub-screen are photographed.

If a photography request from the user occurs while performing a preview mode, the controller 100 may sense the photography request at operation 313, process and capture the first image generated in the first image sensor 120 and process the second image generated in the second image sensor 125 to display the processed images as the preview image on the display unit 130 at operation 315. The controller 100 may display on the display unit 130 the first image of the main screen as a still image and the second image of the sub-screen as the preview image.

The controller 100 may examine occurrence of an action. The action is an input for capturing the second image, and may be an action which is previously set in the setting mode or is set at the time of delivering products. The action may include a touch, a gesture, and the like. For example, the action may be a location rotation of device, a shaking or swing, a motion detection, a brightness change (e.g., an illumination sensor touch or covering), a shutter switch on, a screen hovering, a screen touch, and the like. Further, the action may be set as the user's action, and in such a case, the action may be a blink, a smile, and the like. In the sequential photographic mode of the dual image sensor, the user may register a certain action among the above actions in the setting mode. Further, the action may be sensed through the sensor 150, the input unit 140 and/or the second image sensor 125, and the action sensing unit 115 may sense occurrence of the action sensing signal.

If the action occurs after capturing the first image, the controller 100 may sense the occurrence of the action through the action sensing unit 115 at operation 317, and operate the timer at operation 319. Further, while the timer 113 is operating, the controller 100 may display the first image as a still image on the display unit 130, and display the second image generated in the second image sensor 125 as the preview image at operation 321. The timer may provide time for setting the frame of the second image which is intended to be captured through the second image sensor 125 after the user captures the mains screen image.

If the timer 113 expires, the controller 100 may sense the expiration of the timer at operation 323 and capture the second image at operation 325. The second image may be a sub-screen image. The main screen image has been captured as a still image, and the main screen may be displayed as a still image. The controller 100 may compose the captured second image with the sub-screen area of the first image, and encode the composed image and store the composed image in the storage unit 110 at operation 327.

Further, if the controller 100 does not sense the photography request at operation 313, and if the request for terminating the operation of the image sensor occurs in the preview mode, the controller 100 may sense the request for terminating at operation 331 and terminate the operation of the dual image sensor at operation 333.

Figure 5:
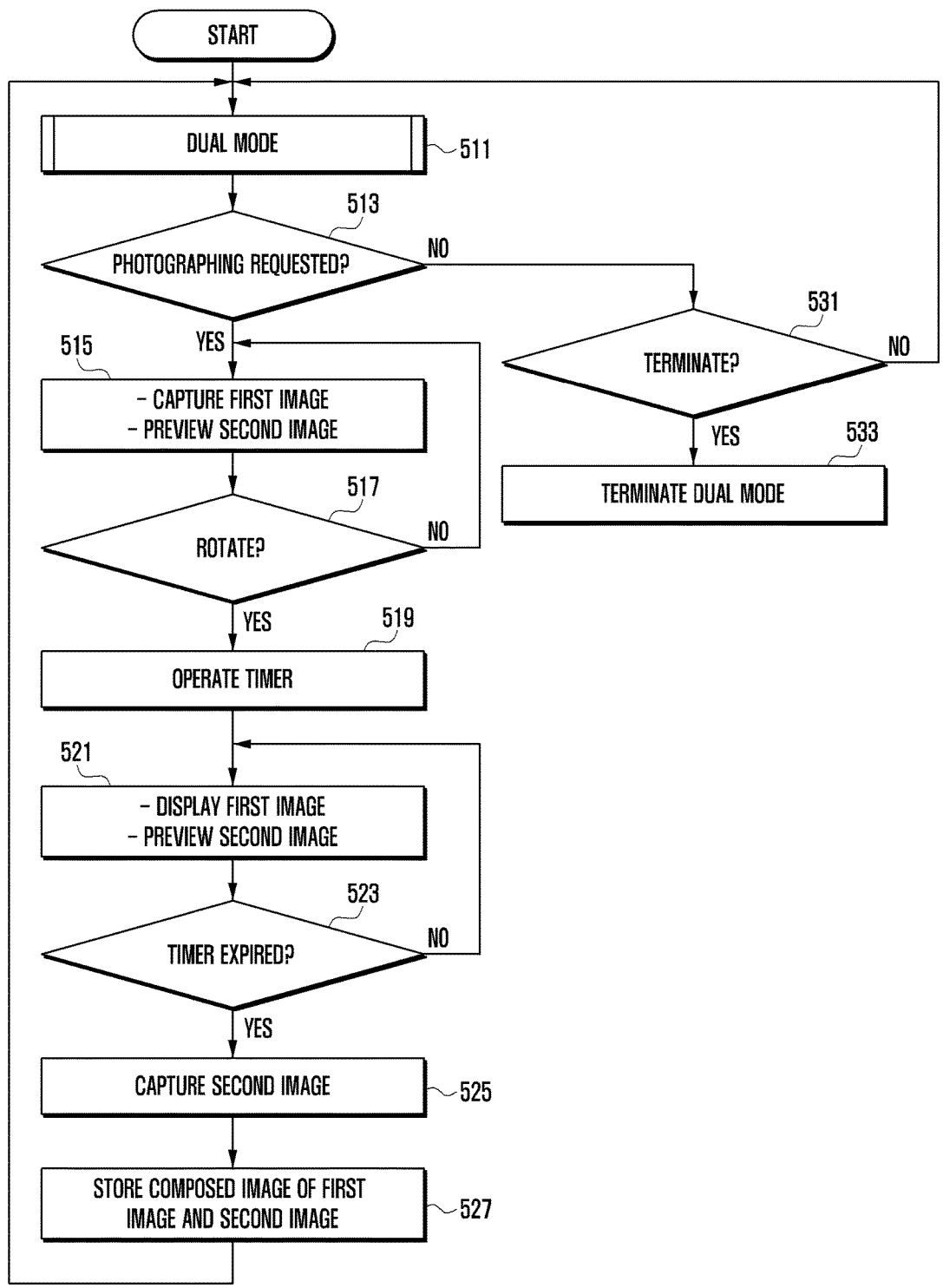
FIG. 5 is a flowchart illustrating an example of photographing a dual image in an electronic device equipped with a dual image sensor according to an embodiment of the present disclosure.

FIG. 5 is a flowchart illustrating an example of photographing a dual image in an electronic device equipped with a dual image sensor according to an embodiment of the present disclosure. FIG. 5 illustrates a case where the action is a rotation (shaking) of the electronic device.

Figure 6:
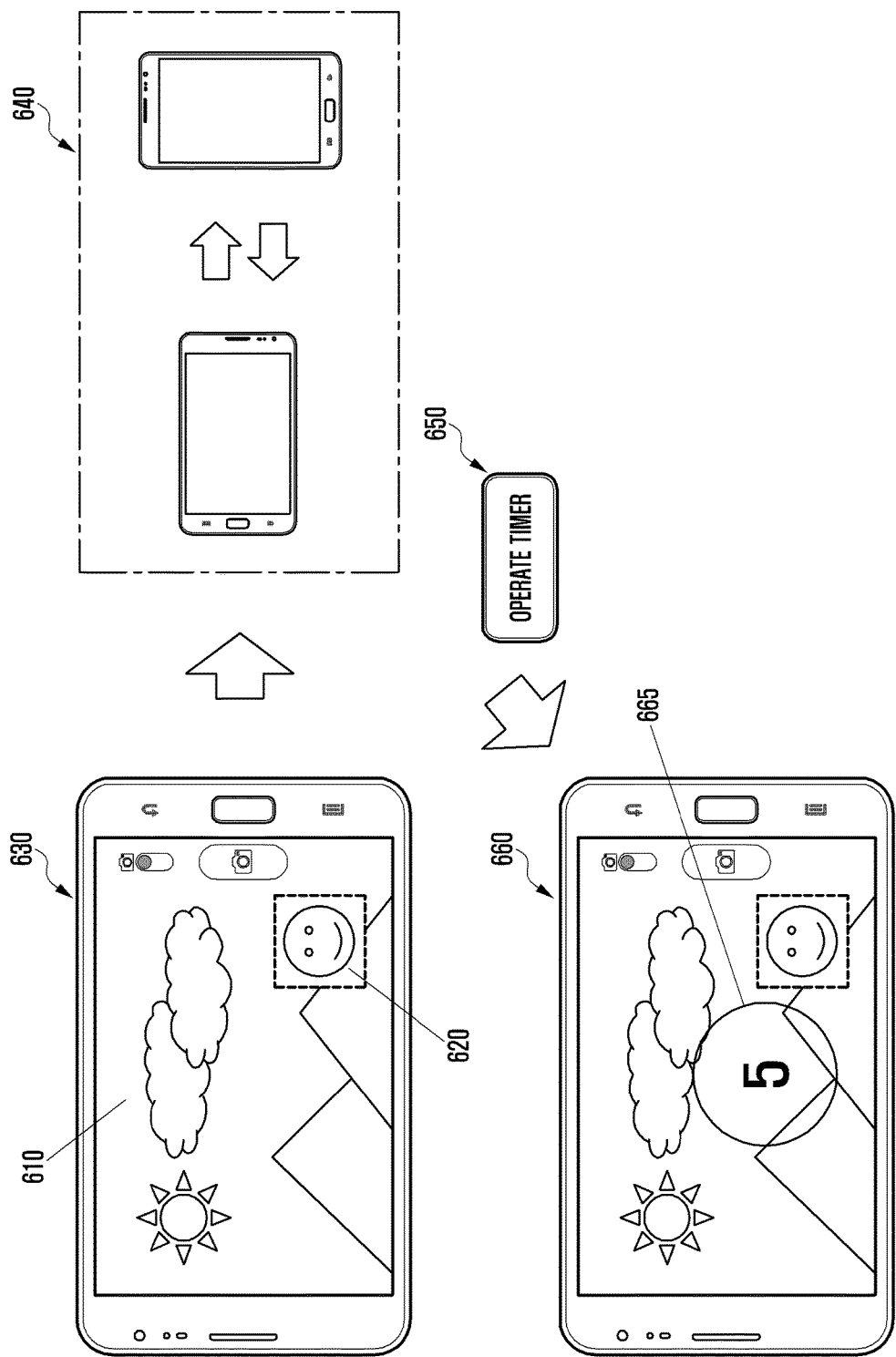
FIG. 6 illustrates a procedure of photographing a dual image as in FIG. 5 according to an embodiment of the present disclosure.

FIG. 6 illustrates a procedure of photographing a dual image as in FIG. 5 according to an embodiment of the present disclosure.

Referring to FIGS. 5 and 6, the controller 100 performs the preview mode at operations 511 to 515, and may capture the first image 610 and display the second image 620 as the preview image as shown in reference numeral 630 of FIG. 6 when photographic operation is requested in the preview mode. The controller 100 may control the electronic device, at operations 511, 513 and 515, in the same manner as operations 311, 313 and 315 of FIG. 3. The action for capturing the second image is set to the rotation (or shaking) of the electronic device. After the first image is captured, if the user rotates the electronic device as in reference numeral 640 of FIG. 6, the sensor 150 may generate the rotation sensing signal of the electronic device to apply the sensing signal to the controller 100, and the action sensing unit 115 of the controller 100 may sense the rotation of the electronic device at operation 517.

The rotation of the electronic device may include rotation, shaking and/or swinging. The user needs time for setting the frame of the desired second image after rotating the electronic device. If the rotation of the electronic device is sensed at operation 517, the controller 100 may operate the timer 113 as in reference numeral 650 of FIG. 6 at operation 519. The timer 113 may guarantee a time required for setting the second image to a desired frame after the user rotates the electronic device.

If the timer 113 is operated at operation 519, the controller 100 may display operation of the timer 113 on the display unit 130 as in reference numeral 665 as shown in reference numeral 660 of FIG. 6, and if the timer 113 expires, the controller 100 may capture the second image and compose the first image and the second image and store the composed image while performing operations 521, 523, 525 and 527. The operation may be performed in the same manner as the operations 321, 323, 325 and 327 of FIG. 3. The controller 100 may control the electronic device, at operations 531 and 533, in the same manner as operations 331 and 333 of FIG. 3.

Figure 7:
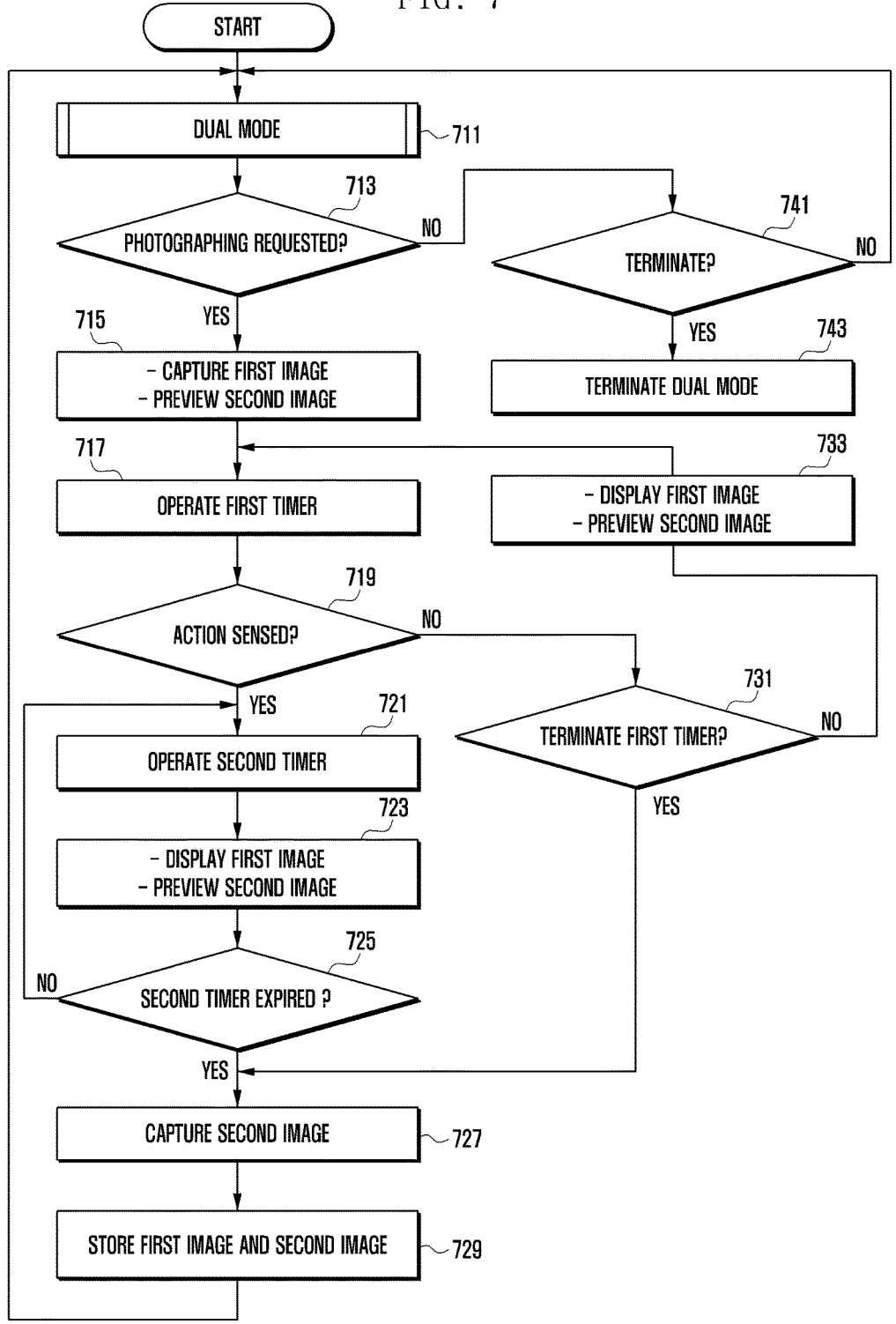
FIG. 7 is a flowchart illustrating a procedure of sequentially photographing a dual image in an electronic device equipped with a dual image sensor according to another embodiment of the present disclosure.

FIG. 7 is a flowchart illustrating a procedure of sequentially photographing a dual image in a device equipped with a dual image sensor according to another embodiment of the present disclosure.

Referring to FIG. 7, when a dual image sensor is operated, the controller 100 may perform a preview mode of the dual image sensor at operation 711. If the user requests a photographic operation in the preview mode, the controller 100 may sense the request at operation 713, capture the first image at operation 715, and display the second image as the preview image. The operations 711, 713 and 715 may be performed in the same manner as the operations 311, 313 and 315 of FIG. 3.

After capturing the first image, the controller 100 may operate the first timer to capture the second image at operation 717, and examine whether an action is sensed at operation 719. That is, after operating the first timer, if an action is sensed before the timer expires, the controller 100 may capture the second image. The actions may be an interaction (for example, hovering or a touch interaction method, and sharing, rotating, swinging, and motion detecting, and the like of the electronic device).

If the first timer is being operated and an action is not sensed, the controller 100 may sense this situation at operation 731 and display the captured first image as the still image of the main screen at operation 733, and may preview the second image, which is photographed in the second image sensor 125, as a preview image on the sub-screen display area. The first timer, which is operated in the above operation 717, may provide time for setting the frame of the second image which is to be captured through the second image sensor 125 after the user captures the mains screen image.

However, after the first timer is operated, if the first timer expires in a state in which an action is not sensed, the controller 100 may sense the expiration of the first timer at operation 731 and capture the second image at operation 727. The second image may become a sub-screen image. The main screen image has been captured as a still image, and thus the main screen may be displayed as a still image.

However, if an action is sensed before the first timer expires, the controller 100 may sense the action at operation 719 and operate the second timer at operation 721. The second timer, which is operated in the above operation 721, provides time for setting the frame of the second image, which is intended to be captured through the second image sensor 125, after the user performs an action. The period of the second timer may be set to the same period as that of the first timer, or may be set to have a different period. Further, the controller 100 may process the captured first image as a still image to be displayed as the main screen, and display the second image obtained from the second image sensor 125 as a preview image on the sub-screen display area until the second timer expires at operation 723. Further, if the second timer expires, the controller 100 may sense the expiration of second timer at operation 725 and capture the second image at operation 727.

After the second image is captured in the above operation 727, the controller 100 may compose the first image and the second image, encode the composed image, and store the encoded image in the storage unit 111 at operation 729, and may return to the above operation 711 to perform a preview mode. Further, if a termination of the image sensor is requested in the preview mode, the controller 100 senses the request at operation 741 and turns off the dual mode at operation 743.

It was assumed, in the description of FIGS. 3 to 7, that the first image generated in the first image sensor 120 is the main screen image, and the second image generated in the second image sensor 125 is a sub-screen image. However, the second image generated in the second image sensor 125 may be selected as the main screen image, and the first image generated in the first image sensor 120 may be selected as the sub-screen image. Further, in the description of FIGS. 3 to 7, it was assumed that, in the sequential photographic mode, the sub-screen image is captured when the timer expires after the main screen image is captured, but, on the contrary to this, the sub-screen image may be first captured, and the main screen image may be captured when the timer expires.

Figure 8:
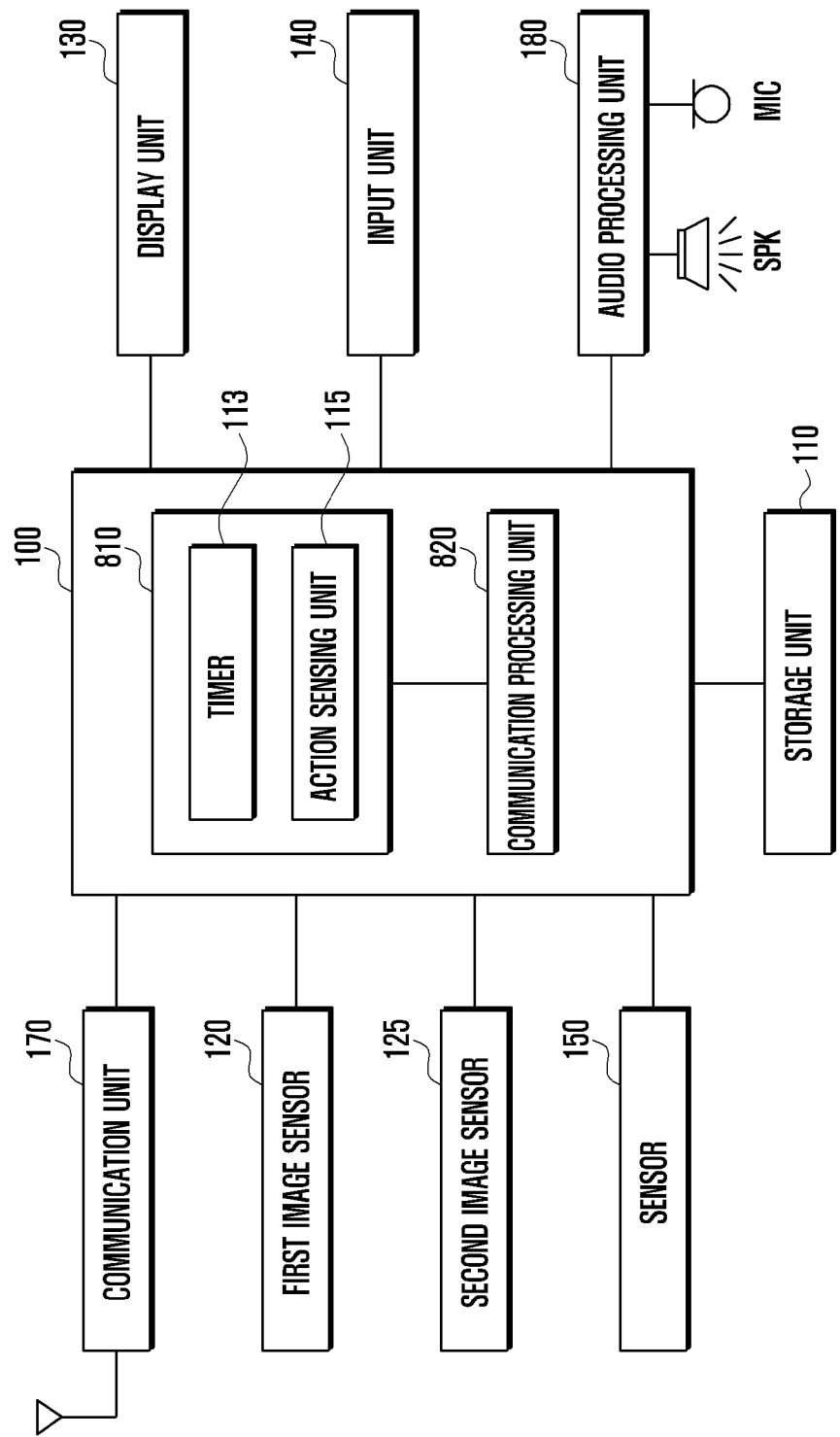
FIG. 8 illustrates a configuration of a portable terminal which performs a photographic operation according to an embodiment of the present disclosure.

FIG. 8 illustrates a configuration of a portable terminal which performs a photographic operation according to an embodiment of the present disclosure. The portable terminal may include a mobile phone including a smart phone, an MP3 terminal, a tablet personal computer, and a portable or wearable computer, and the like.

Referring to FIG. 8, the communication unit 170 may perform a wireless communication function with a base station or an Internet server. The communication unit 170 may include a transmission unit which up-converts the frequency of a transmitted signal and amplifies power, and a reception unit which low-noise-amplifies the received signal and down-converts the frequency. Further, the communication unit 170 may include a modulation unit and a demodulation unit. The modulation unit modulates a transmitted signal and transmits the modulated signal to the transmission unit, and the demodulation unit may demodulate a signal received through the reception unit. The modulation and demodulation unit may be an LTE, WCDMA, GSM, and the like or Wi-Fi, WIBRO, NFC, Bluetooth, and the like. It is assumed, in the various embodiments of the present disclosure, that the communication unit 170 is equipped with LTE, Wi-Fi, and Bluetooth communication units.

The first image sensor 120 may photograph an image of a high resolution by the rear image sensor which is mounted on the rear side of the terminal device. The second image sensor 125 is a front image sensor which is mounted on the front side of the terminal device, and may photograph an image of a low resolution which is relatively lower than the first image sensor 120.

The controller 100 may control overall operation of the portable terminal, and may include an Application Processor (AP) 810 for controlling the process of various applications of the portable terminal, and a Communication Processor (CP) 820 for controlling the communication function of the portable terminal. Further, the application processing unit 810 includes a timer 113 and an action sensing unit 115, and controls to display the first image and the second image as the main screen image and the sub-screen image in the preview mode of the dual mode, and photograph the first image and the second image by using the timer 113 and the action sensing unit 115 in the capturing mode, and compose and store the images.

The storage unit 110 may include an operation program of a terminal and a program memory for storing a program according to an embodiment of the present disclosure, and a data memory for storing tables for operation of the terminal and data which is generated while performing a program.

The display unit 130 may display information on the application which is being executed under control of the controller 100. Further, the display unit 130 may display images of the main screen and the sub-screen under control of the controller 100 in the dual mode. The display unit 130 may be configured with an LCD or an OLED. The input unit 140 may be implemented in a capacitive type or a resistive type, and output the location information of the user's touch (it is assumed that the touch is a finger touch) to the controller 100. Further, the input unit 140 may further include an EMR sensor pad, and may sense a pen touch input and output the pen touch input to the controller 100. The display unit 130 and the input unit 140 may be integrally formed.

The sensor 150 may include sensors for sensing movement of the portable terminal. The sensors may include an acceleration sensor, a geomagnetic sensor, a gyro sensor and/or a location sensing sensor. The audio processing unit 180 may process a voice signal which is generated in the communication mode under control of the controller 100.

The controller 100 of the portable terminal 100 may include a camera button for selecting an image sensor for displaying as the main screen image on the display unit 130, and a dual button for turning on/off the dual mode setting. Further, when the user's dual button is turned on, the controller 100 performs a dual mode for operating the first image sensor 120 and the second image sensor 125, and in the dual mode, the controller 100 may display the images outputted from the image sensors 120 and 125 as the dual image of the main screen and the sub-screen on the display unit 130. Further, the controller 100 may select the image sensor which outputs the main screen image by selection of the image sensor selection button in the dual mode. According to an embodiment of the present disclosure, it is assumed that, when the portable terminal is operated in a dual mode, the first image sensor 120 is selected as the main screen image sensor and the second image sensor 125 is selected as the sub-screen image sensor.

When the dual image sensor of the portable terminal is operated, in the preview mode, the controller 100 may display the first image generated in the first image sensor 120 as the main screen, and display the second image generated in the second image sensor 125 as the sub-screen. The application processing unit 810 of the controller 100 may include a timer 113 and an action sensing unit 115, and may photograph the first image and the second image by using the timer 113 and the action sensing unit 115 when photography is requested.

The method of photographing the main screen image and the sub-screen image according to one embodiment of the present disclosure will be described. When a photographic operation is requested, the controller 100 may photograph the main screen image and the sub-screen image while performing a procedure as in FIG. 3. That is, when a photographic operation is requested in the preview mode, first, the controller 100 may capture the main screen image which is outputted from the image sensor which generates the main screen image, and preview-display the sub-screen image which is outputted from the image sensor which generates the sub-screen image. The controller 100 may examine whether an action for capturing the second image is generated through the action sensing unit 115.

The action may be previously set, and be generated through the sensor 150, the second image sensor 125 and/or the input unit 140 which is a touch panel. If the action is an action that detects the movement (rotation, swinging, or shaking) of the electronic device, the action sensing unit 115 may sense occurrence of the action through the sensor 150. Further, if the action is the user's facial expression (e.g., a blink, a smile, etc.), the action sensing unit 115 may sense occurrence of the action through the second image sensor 125. Further, if the action is a gesture or a touch interaction on the display unit 130, the action sensing unit 115 may sense the occurrence of the action through the input unit 140.

If an action is sensed by the action sensing unit 115, the controller 100 operates the timer 113, and if the timer expires, the controller 100 may capture the sub-screen image which is outputted from the image sensor which generates the sub-screen image. The controller 100 may compose the captured main screen image and sub-screen image, and process and store the composed image.

Further, the method of photographing the main screen image and the sub-screen image according to anther embodiment of the present disclosure will be described. The controller 100 may photograph the main screen image and the sub-screen image while performing a procedure as in FIG. 7. The timer 113 may include a first timer and a second timer. First, if a photographic operation is requested in the preview mode, the controller 100 may capture the main screen image outputted from the image sensor which generates the main screen image, preview-display the image outputted from the image sensor which generates the sub-screen screen image, and operate the first timer.

If an action is not sensed until the first timer expires, the controller 100 may capture the sub-screen image outputted from the second image sensor, compose the captured main screen image and sub-screen image, and process and store the composed image. However, if an action is sensed in the action sensing unit 115 before the first timer expires, the controller 100 operates the second timer, and if the second timer expires, the controller 100 may capture a sub-screen image which is outputted from the image sensor which generates the sub-screen image. The controller 100 may compose the captured main screen image and sub-screen image, and process and store the composed image. The period of the first timer may be identical with or different from the period of the second timer. Further, the action may be the same as the action of the above described one embodiment.

According to the present disclosure, images, which are recognized through at least one image sensor, may be captured, and the captured images may be stored as a main screen or a sub-screen. A plurality of images may be obtained by one photography command by automatically photographing the sub-screen image by operating the timer after photographing the main screen image, and a plurality of natural images desired by the user may be obtained when photographed by the timer. Further, for example, when a sequential photographic mode is set, if an action is sensed after photographing the main-screen image by the photography request, the sub-screen image may be photographed when a time period is elapsed, and thus it is possible to obtain the sub-screen image of a desired form after photographing the main-screen image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile communication device comprising:
 a plurality of image sensors including a first image sensor and a second image sensor;

a touchscreen display;
a processor adapted to:
   display at least one portion of a first image in a first area of the touchscreen display, as a first preview image, and at least one portion of a second image in a second area of the touchscreen display, as a second preview image, the first image being obtained using the first image sensor in real time, the second image being obtained using the second image sensor in real time, both the first preview image and the second preview image being displayed together;
   generate a first still image from the first image sensor, in response to a user input; and
   display at least one portion of the first still image in the first area while displaying the second preview image in the second area,
   wherein the display of the at least one portion of the first still image replaces the display of the first preview image while the second preview image is displayed, the display of the at least one portion of the first still image occupying the first area of the touchscreen display previously occupied by the first preview image.

2. The mobile communication device of claim 1, wherein the first image sensor is mounted on a same side of the mobile communication device as the touchscreen display.

3. The mobile communication device of claim 1, wherein the processor is further adapted to:
   receive, via the touchscreen display, another user input to operate the first and second image sensors, prior to the displaying of the first and second preview images.

4. The mobile communication device of claim 1, wherein the first area is positioned closer to the first image sensor than the second area.

5. The mobile communication device of claim 1, wherein the processor is further adapted to change position and size of the first and second areas, in response to another user input.

6. The mobile communication device of claim 1, wherein the first area is separated from the second area, and positioned in proximity of the second area.

7. The mobile communication device of claim 1, wherein the at least one portion of the first image is generated by scaling or subsampling of the first image.

8. The mobile communication device of claim 1, wherein the first still image is generated using the first preview image.

9. The mobile communication device of claim 1, wherein the processor is further adapted to:
   after the at least one portion of the first still image and the second preview image is displayed, generate a second still image from the second image sensor, in response to another user input.

10. The mobile communication device of claim 9, wherein the processor is further adapted to:
    display at least one portion of the second still image in the second area while displaying the at least one portion of the first still image in the first area.

11. The mobile communication device of claim 9, wherein the processor is further adapted to:
    generate a third image by combining the at least one portion of the first still image and at least one portion of the second still image.

12. The mobile communication device of claim 11, wherein the processor is further adapted to:
    display the third image via the touchscreen display.

13. The mobile communication device of claim 11, wherein the processor is further adapted to:
    store the third image to memory operatively coupled with the mobile communication device.

14. A method of processing an image using a mobile communication device, the method comprising:
    displaying at least one portion of a first image in a first area of the touchscreen display, as a first preview image, and at least one portion of a second image in a second area of the touchscreen display, as a second preview image, the first image being obtained using the first image sensor in real time, the second image being obtained using the second image sensor in real time, both the first preview image and the second preview image being displayed together;
    generating a first still image from the first image sensor, in response to a first user input; and
    displaying at least one portion of the first still image in the first area while displaying the second preview image in the second area,
    wherein the displaying of the at least one portion of the first still image replaces the display of the first preview image while the second preview image is displayed, the display of the at least one portion of the first still image occupying the first area of the touchscreen display previously occupied by the first preview image.

15. The method of claim 14, further comprising:
    receiving, via the touchscreen display, another user input to operate the first and second image sensors, prior to the displaying of the first and second preview images.

16. The method of claim 14, further comprising:
    generating a second still image from the second image sensor, in response to another user input.

17. The method of claim 16, further comprising:
    displaying at least one portion of the second still image in the second area while displaying the at least one portion of the first still image in the first area.

18. The method of claim 16, further comprising:
    generating a third image by combining the at least one portion of the first still image and at least one portion of the second still image; and
    displaying the third image via the touchscreen display.

19. The method of claim 16, further comprising:
    generating a third image by combining the at least one portion of the first still image and at least one portion of the second still image; and
    storing the third image to memory operatively coupled with the mobile communication device.

20. A non-transitory machine-readable storage device storing instructions that, when executed by one or more processors, cause the one or more processors to perform operations comprising:
    displaying at least one portion of a first image in a first area of the touchscreen display, as a first preview image, and at least one portion of a second image in a second area of the touchscreen display, as a second preview image, the first image being obtained using the first image sensor in real time, the second image being obtained using the second image sensor in real time, both the first preview image and the second preview image being displayed together;
    generating a first still image from the first image sensor, in response to a first user input; and
    displaying at least one portion of the first still image in the first area while displaying the second preview image in the second area, wherein the display of the at least one portion of the first still image replaces the display of the first preview image while the second preview image is displayed, the display of the at least one portion of the first still image occupying the first area of the touchscreen display previously occupied by the first preview image.

* * * * *